United States Patent
Nguyen

(10) Patent No.: US 10,385,678 B2
(45) Date of Patent: Aug. 20, 2019

(54) METHOD FOR ANALYSING PORE PRESSURE IN SHALE FORMATIONS

(71) Applicant: CONOCOPHILLIPS COMPANY, Houston, TX (US)

(72) Inventor: Ha Dinh Nguyen, Katy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 574 days.

(21) Appl. No.: 14/221,681

(22) Filed: Mar. 21, 2014

(65) Prior Publication Data

US 2015/0267527 A1    Sep. 24, 2015

(51) Int. Cl.
  *G01V 3/20*  (2006.01)
  *E21B 47/06*  (2012.01)

(52) U.S. Cl.
  CPC .............. *E21B 47/06* (2013.01); *G01V 3/20* (2013.01)

(58) Field of Classification Search
  CPC .................................. E21B 47/06; G01V 3/20
  See application file for complete search history.

(56) References Cited

U.S. PATENT DOCUMENTS

| | | | | |
|---|---|---|---|---|
| 4,833,914 A * | 5/1989 | Rasmus | ................... | E21B 21/08 175/50 |
| 5,282,384 A * | 2/1994 | Holbrook | ................ | E21B 21/08 702/12 |
| 5,663,499 A * | 9/1997 | Semmelbeck | ............ | G01V 3/38 166/250.02 |
| 6,473,696 B1 * | 10/2002 | Onyia | ....................... | G01V 1/32 702/14 |
| 9,238,962 B2 * | 1/2016 | Husser | ................... | E21B 47/101 |
| 2003/0004648 A1 * | 1/2003 | Huffman | ................ | G01V 1/284 702/14 |
| 2005/0030020 A1 * | 2/2005 | Siess | ........................ | G01V 3/32 324/303 |
| 2009/0260823 A1 * | 10/2009 | Prince-Wright | ....... | C10G 21/22 166/302 |
| 2010/0238764 A1 * | 9/2010 | Pistre | ....................... | G01V 1/30 367/25 |
| 2011/0067923 A1 * | 3/2011 | Leuchtenberg | ......... | E21B 21/08 175/57 |
| 2013/0047696 A1 * | 2/2013 | Rasmus | ................... | G01V 9/00 73/1.67 |

(Continued)

OTHER PUBLICATIONS

Bowers, G. L.—"Pore pressure estimation from velocity data: accounting for overpressure mechanisms besides undercompaction" 1994, SPE Drilling & Completion, Jun. 1995, IADC/SPE Drilling Conference, Dallas, Texas, Feb. 15-18, IADC/SPE Paper 27488, p. 89-95; 7 pgs.

(Continued)

*Primary Examiner* — Manuel A Rivera Vargas
*Assistant Examiner* — Yaritza H Perez Bermudez
(74) *Attorney, Agent, or Firm* — Conocophillips Company

(57) ABSTRACT

The invention relates to a method for estimating pore pressure in subterranean shale formations such as gas- or organic-rich shale where pore pressure predictions based on either a resistivity log or a porosity-indicative log such as sonic tend to be inaccurate. The method involves combining the resistivity log with the porosity-indicative log using a Eaton formula to give an estimate of pore pressure which is accurate both for conventional water wet shale and for organic-rich shale.

15 Claims, 2 Drawing Sheets

(56) References Cited

U.S. PATENT DOCUMENTS

| | | | |
|---|---|---|---|
| 2013/0066558 A1* | 3/2013 | Wessling | G01V 11/00 702/7 |
| 2014/0345941 A1* | 11/2014 | Sutter | E21B 34/16 175/25 |
| 2014/0352951 A1* | 12/2014 | Suter | E21B 43/12 166/250.01 |
| 2016/0215565 A1* | 7/2016 | De Prisco | E21B 47/06 |
| 2016/0222741 A1* | 8/2016 | Lovorn | E21B 47/06 |
| 2016/0265342 A1* | 9/2016 | De Prisco | E21B 47/06 |
| 2016/0266268 A1* | 9/2016 | Amer | G01V 1/30 |

OTHER PUBLICATIONS

Eaton, B. A.—"The equation for geopressure prediction from well logs", 1975, Society of Petroleum Engineers of AIME, Paper No. SPE 5544; 11 pgs.

Finneran, J. M., et al—"Formation tester while drilling experience in Caspian development projects", 2005, SPE Annual Technical Conference and Exhibition, Dallas, Texas, Oct. 9-12, 2005, paper SPE 96719, pp. 1-11; 11 pgs.

Gunter, James M., et al—"Improved use of wireline testers for reservoir evaluation", 1987, Journal of Petroleum Technology, Jun. 1987, p. 635-644; 10 pgs.

Hooper, M., et al—"Applications for an LWD Formation Tester", 1999, SPE European Formation Damage Conference, The Hague, Netherland, May 28-Jun. 1, 1999, paper SPE 52794, pp. 1-8; 8 pgs.

Mercer, R. F., "Liberated, produced, recycled or contamination", 1974, SPWLA 15th Annual Logging Symposium, Jun. 2-5, 1974; 20 pgs.

Passey, Q. R, et al—"A practical model for organic richness from porosity and resistivity logs", 1990, American Association of Petroleum Geologists Bulletin, v. 74, No. 12, p. 1777-1794; 18 pgs.

\* cited by examiner

METHOD FOR ANALYSING PORE PRESSURE IN SHALE FORMATIONS

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to a method for analyzing pore pressure in a subterranean shale formation.

BACKGROUND OF THE INVENTION

When drilling into a subterranean formation in connection with the extraction of hydrocarbons, it is important to know the pore pressure (also known as formation pressure). In order to avoid water, hydrocarbon gas or oil flowing out of a well while it is being drilled, offsetting pressure in the hole is controlled by the use of drilling mud. The pressure produced by the mud is designed to be greater than the estimated pore pressure of the formations being drilled. The magnitude of the pressure exerted by the mud is controlled by varying the density of the mud by adding appropriate amounts of weighting material such as barite or hematite. In addition, the pressure exerted by pumps which pump the drilling mud can be varied. More recent techniques such as managed pressure drilling exert a back-pressure on the mud system. The pressure maintained on the mud system must equal or exceed the pore or formation pressure in order to prevent an untimely exit of fluids which is a potentially dangerous event in addition to being wasteful of natural resource. The pore pressure tends to vary along the length of the well, which adds to the complexity.

Current techniques for pore pressure estimation during drilling in sedimentary shale formations include the use of calculations based on measurements of rock resistivity, sonic travel time or velocity, and density (Eaton, 1975; Mouchet and Mitchell, 1989; Bowers, 1994). These measurements are obtained using logging tools run in the hole either while drilling, known as logging while drilling (LWD), or following drilling, which is commonly referred to as wireline logging. These pore pressure calculations assume that the pores within shale or clay rocks are filled with water and have very little free oil or gas in the pores, and are comprised of less than a few percent organic matter incorporated in the original sediment.

LWD and wireline logging produce a continuous plot or curve of data over the length of the well, or over that part for which data has been gathered. From any one of these curves, it has been possible to derive reasonably accurate values of pore pressure. These calculations can be verified or at least supported by direct pressure measurements obtained from more permeable rocks such as sandstone and limestones interstratified with the shale obtained using tools such as wireline formation testers either following drilling or while drilling (Gunter and Moore, 1987; Hooper et. al., 1999; Finneran et. al., 2005). These measurements cannot be taken continuously due to expense and they only work in relatively porous and permeable rocks interstratified with rocks lacking sufficient permeability to liquid or gas flow. These tools cannot directly take pressure measurements in shale and clay rocks due to their very low permeability relative to most sandstone and limestone rocks. Therefore calculations to estimate pore pressure based on log response in shale and clay rocks are more commonly used to monitor pore pressure rather than direct pressure measurements.

Besides direct pressure measurements qualitative estimates of pore pressure while drilling can be based on the relative volume of natural gas in the mud system and observations of the volume and character of cuttings, the small rock chips removed by the drill bit, and other rock samples brought up from the bottom of the well. In general small volumes of natural gas are present in most rocks in the subsurface perhaps mostly dissolved in water in the pore space. It is expected that small volumes of natural gas will be released simply when the drill bit excavates rock as the well is drilled into the earth. When larger than expected volumes of natural gas are detected this indicates that some additional source of gas is active which is flowing or seeping into the well. The conclusion is that at some point in the well the pressure exerted by the drilling mud is less than the formation pressure allowing excess fluid and natural gas to seep or flow into the well. This provides a means of estimating the pore pressure and, although qualitative, it provides an additional means to confirm or support the well log based calculations of pore pressure (Mercer, 1963). In addition to the volume of gas, cuttings that appear to be larger than expected for the type of bit in the hole or which have a morphology indicative of rock failure can suggest that the formation pore pressure is less than the pressure exerted by the mud (Mouchet and Mitchell, 1989).

A problem arises in shale formations rich in organic matter or free oil or gas where it is not possible to take direct measurements of pressure due to the inherent low permeability and where qualitative approaches such as gas volumes and cuttings evaluation can be insufficient. Organic matter, or free oil or gas in shale rock, usually referred to as source rocks or unconventional gas shales, will affect the log responses used for pore pressure calculations independent of the pore pressure or porosity state of the shale rock therefore detrimentally affecting the accuracy of the pore pressure calculation. The effect of organic matter and free oil and gas in shale rock has been known for a number of years (Passey, et. al., 1990). In general organic matter and free oil and gas will greatly increase the resistivity measurement of the shale relative to a water-wet shale under the same down-hole conditions, as well as increase the travel time, reduce the velocity, and decrease the density. This affect will lead to an under-estimation of the pore pressure based on the resistivity measurements in an organic or shale gas rocks using the accepted equations, and will result in an over-estimation of the pore pressure based on the sonic or density log measurements There is therefore a need for a relatively inexpensive technique for assessing pore pressure in shale formations, especially those types of shale formation mentioned above. The technique would ideally be applicable not only to shale formations of the type which tend to produce inaccurate results from log data, but also to any other shale formation, so that the same technique may be used without knowing in advance what type of shale formation is being analysed.

BRIEF SUMMARY OF THE DISCLOSURE

The inventor has discovered that, in shale formations which tend to give inaccurate results for pore pressure from log data, two types of log data have errors which may cancel each other. In problematic shale formations such as organic rich shales, the deeper central parts of shale basins and so-called unconventional shale, or in shale gas formations, the resistivity log tends to read too high. This leads to an under-estimation of pore pressure.

In these formations the sonic log also tends to read high due to the affects of the slower organic material in the rock framework and free oil and natural gas in the pore space indicating a porosity greater than is present in the rock due to the assumption of the shale being water-wet. Similar to the sonic log, density log measurements, or bulk density (RhoB) tend to read too low, leading to an over-estimation of porosity in shale source rocks or unconventional shale gas reservoirs relative to the assumed and typical water-wet shale and clayrocks. This over-estimation of porosity would in turn lead to an over-estimation of pore pressure using typical pore pressure equations. Other log values designed to estimate rock porosity would similarly be affected by organic material and natural gas and oil which would be detrimentally affect the calculation of pore pressure if used for that purpose.

It is difficult or impossible to predict in advance by how much each of these logs will over- or under-estimate pore pressure, otherwise an adjustment could be made to the estimate. However, the inventor has surprisingly discovered that if these two types of log are combined (i.e. the resistivity log and a porosity-indicating log), the errors tend to cancel and a relatively accurate estimate results.

In one embodiment of the invention, a method for analyzing pore pressure in a subterranean shale formation comprises:
  (a) gathering (i) resistivity log data (symbol R) and (ii) one or more type of log data indicative of porosity from a well in said formation; and
  (b) mathematically combining said resistivity log data with said log data indicative of porosity to derive a value for pore pressure.

Said porosity-indicative log data may be sonic slowness with symbol DT or $\Delta T$ (commonly referred to as just "sonic"), bulk density with symbol RhoB, some other log indicative of porosity, or any combination of two or more of these.

Values for pore pressure may be derived using an Eaton formula. Optionally, separate values for pore pressure may be derived from each of said resistivity log data and porosity-indicative log data respectively and then combined. Alternatively, the pore pressure estimate may be derived directly from a single mathematical step in which expressions for the pore pressure based on said resistivity log data and based on said porosity-indicative log data are combined. In either case, the values or expressions, respectively, may be combined using a weighted mean, where the weighting values (a, b) may be selected in advance based on rock type.

The equation used to derived said estimated pore pressure may be:

$$P_{combined}=(a*(S_v-(S_v-P_h)*(R_0/R^n)^x+b*(S_v-(S_v-P_h)*(\Delta T_n/\Delta T_0)^y))/(a+b)$$

where:
a, b, are constants in the calculation which can be varied to account for changes in the shale rock type and the relative volume of organics, oil or gas
$S_v$ is vertical stress at current depth
$P_{combined}$ is pore pressure calculated from both resistivity and sonic curves
$P_h$ is hydrostatic pressure
$R_0, \Delta T_0$ is base line (trend) resistivity and sonic interval transit time under normal formation conditions at current depth
$R_n, \Delta T_n$ observed resistivity and sonic interval transit time at current depth
x, y are Eaton exponents (see Eaton paper whose details are given in full below and which is incorporated herein by reference).

The sonic ($\Delta T$) parameter in this expression may be replaced with another porosity-indicative log parameter, or a parameter representing a combination of two or more porosity-indicative logs.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The following examples are provided by way of explanation of the invention, one of many embodiments of the invention, and the example should not be read to limit, or define, the scope of the invention.

EXAMPLE 1

In this example, a well was drilled in the Bossier Formation shale of Jurassic age in Texas, USA. A logging suite of tools was inserted into the well and used to gather resistivity log data and sonic log data. The two logs were separately analysed using the Eaton technique to derive values for pore pressure. An estimate of pore pressure was also calculated using the following equation based on a weighted average of the Eaton expressions for each log.

$$P_{combined}=(a*(S_v-(S_v-P_h)*(R_0/R_n)^x+b*(S_v-(S_v-P_h)*(\Delta T_n/\Delta T_0)^y))/(a+b)$$

where:
a, b, are constants in the calculation which can be varied to account for changes in the shale rock type and the relative volume of organics, oil or gas
$S_v$ is vertical stress at current depth
$P_{combined}$ is pore pressure calculated from both resistivity and sonic curves
$P_h$ is hydrostatic pressure
$R_0, \Delta T_0$ is based line (trend) resistivity and sonic interval transit time at current depth
$R_n, \Delta T_n$ observed resistivity and sonic interval transit time at current depth
x, y are Eaton exponents.

Figure 1:
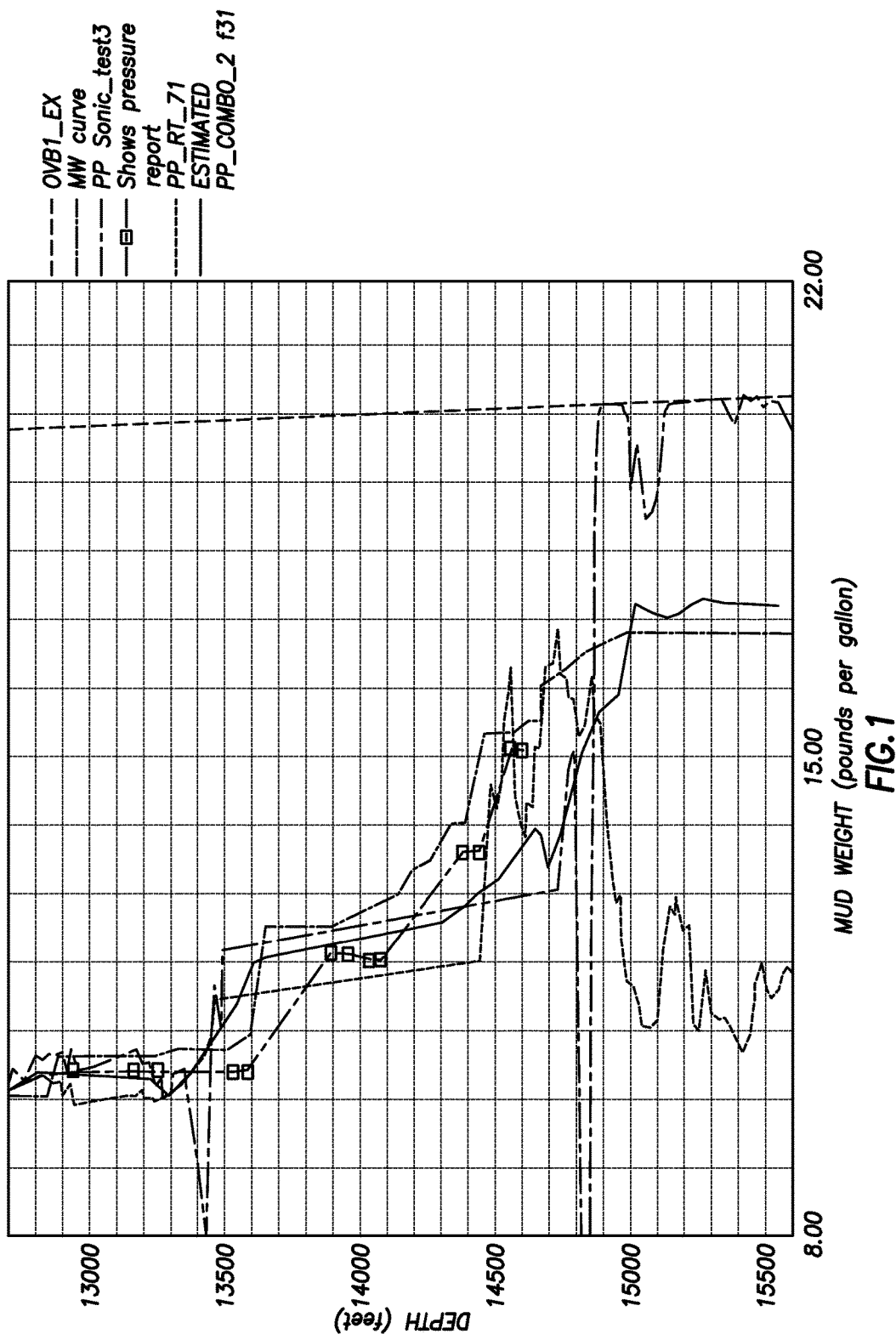
FIG. 1 is combined plot showing pore pressure as estimated from a resistivity log, from a sonic log and as estimated in a method according to the invention.

In this example, the weighting constant a was set to 1, and the weighting constant b was set to 2. This was based on comparison to measured pressures in inter-bedded sandstones as well as qualitative judgment based on high gas volumes while drilling with very high mud weight FIG. 1 shows plots of the pore pressure calculated from the resistivity log data ("PP_RT_71") and from the sonic log data ("PP_Sonic_test3") for this example. The figure also shows a plot for drilling mud weight. The plot called "OVBI_EX" is the weight of overlying rock, estimated from other information. The plot called "Estimated PP_COMBO_2 f31" is the estimate of pore pressure based on the above equation using both resistivity and sonic log data.

Finally, FIG. 1 includes symbols indicating values for discrete localized pressure values ("Shows pressure report").

The y scale in FIG. 1 is depth in feet; the x scale is in pounds per gallon (PPG) which is a unit related to mud weight, i.e. the density of mud required to balance the pore pressure; it is, in effect, a unit of pressure.

It can be seen that the mud weight plot correlates fairly strongly with a notional curve plotted through the discrete pressure readings.

On the right hand side of FIG. 1 can be seen the plot of pore pressure based on the sonic log, which is giving readings which are much too high and very erratic in comparison with the mud weight and direct pressure readings. This is especially true of the deeper readings below about 14,500 ft. Clearly there is no obvious adjustment to the sonic log-based pressure plot to bring it into line with the values from mud weight and discrete pressure readings.

On the left hand side of FIG. 1 is the plot of pore pressure based on the resistivity log, which is giving readings which are much too low and, like the sonic log, very erratic. Again, this is especially true of the deeper readings below about 14,500 ft.

In contrast, the combined pore pressure plot, based on both the resistivity and sonic logs, correlates well to the direct pressure readings and mud weight plot.

EXAMPLE 2

In this example, a well was drilled in a different part of the Bossier Formation shale of Jurassic age in Texas, USA.

The units on the axes are as for FIG. 1/Example 1, and the readings are similar to those in Example 1. "MW morgan" represents mud weight, "PP_DT_test1" represents a sonic reading, "PP_Rt_test1" represents resistivity, "OVBI_EX" represents overburden, and "PPcombo" represents the combination of the sonic and resistivity logs, based on the Eaton type equation given above.

As with Example 1, it can easily be seen that the combined curve correlates with the mud weight curve more closely than the either of the sonic or resistivity curves, particularly for the lower part of the curve. The lower part of the curve represents measurements in a part of the shale formation which is gas- or organic-rich, i.e. a region in which predictions of pore pressure based only on sonic or only on resistivity tend to be inaccurate. This inaccuracy compared with the mud weight line is easily seen from FIG. 2, especially for the resistivity log curve.

Figure 2:
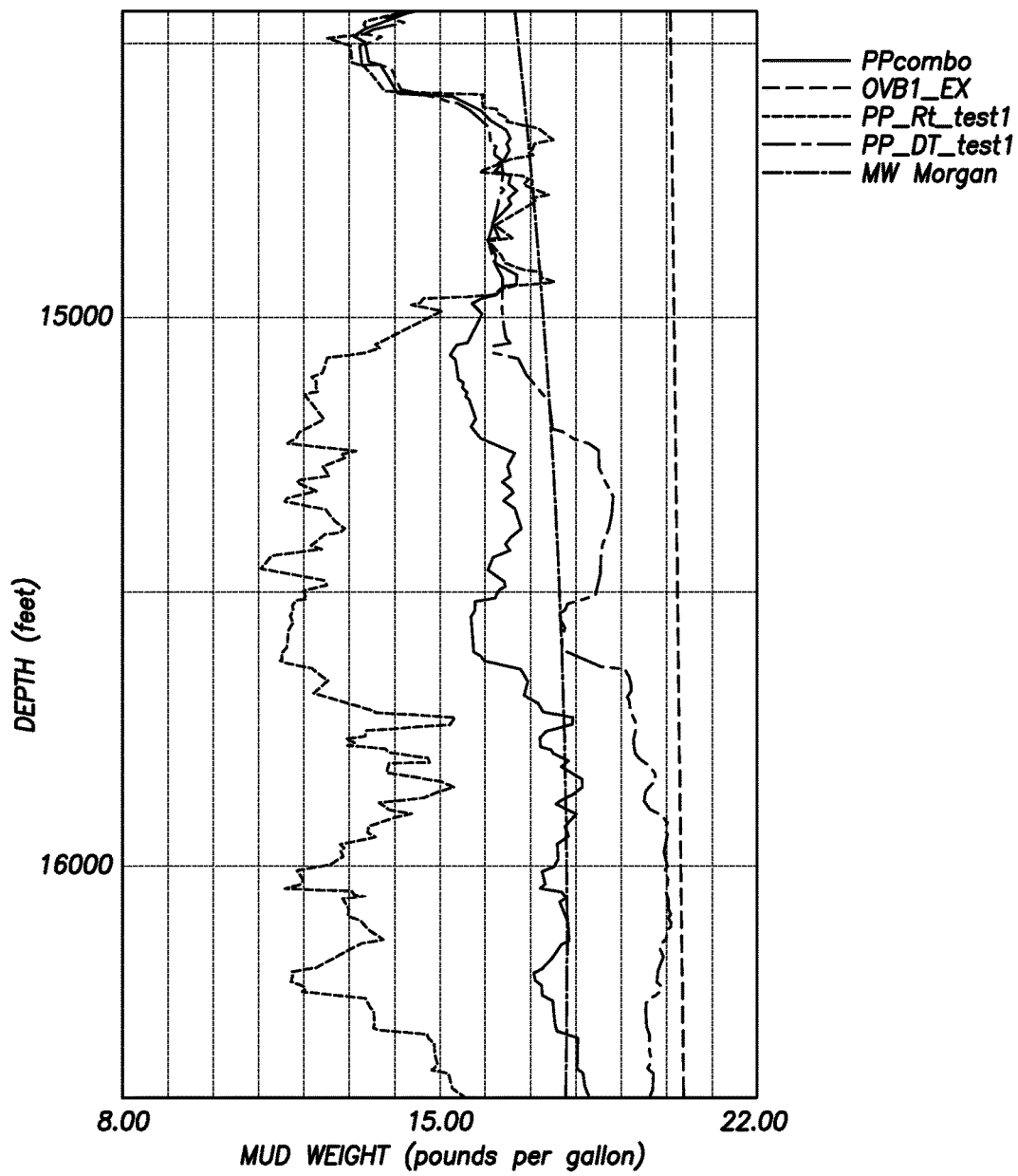
FIG. 2 is a plot similar to FIG. 1 for a different region of shale.

The region above about 15,000 feet in this formation is conventional so-called water wet shale, where the resistivity and sonic logs would each be expected to give a reasonably accurate indication of pore pressure. This can be seen from the sonic and resistivity curves in FIG. 2 which substantially converge above 15,000 feet and give values for pore pressure which are consistent with the mud weight. The combined curve above 15,000 feet in FIG. 2 can also be seen to give values which are consistent with the mud weight. FIG. 2 demonstrates how the combined measurement may be used in any type of shale.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

Bowers, G. L., 1994, Pore pressure estimation from velocity data: accounting for overpressure mechanisms besides undercompaction: SPE drilling conference, Dallas, Tex., Feb. 15-18, 1994, IADC/SPE Paper 27488, p. 515-530.

Eaton, B. A., 1975, The equation for geopressure prediction from well logs: Society of Petroleum Engineers of AIME, Paper Number SPE5544, p. 11.

Finneran, J. M., C. Green, H. Roed, B. J. Burinda, I. D. C. Mitchell, and M. A. Proett, 2005, Formation tester while drilling experience in Caspian development projects: 2005 SPE Annual Technical Conference and Exhibition, Dallas, Tex., 9-12 Oct. 2005, paper SPE 96719

Gunter, James M., and C. V. Moore, 1987, Improved use of wireline testers for reservoir evaluation: Journal of Petroleum Technology, June, 1987, p. 635-644.

Hooper, M., C. MacDonald, R. Shalhope, and P. Boonen, 1999, Applications for an LWD Formation Tester: SPE European Formation Damage Conference, The Hague, Netherland, 28 May-Jun. 1, 1999, paper SPE 52794, p. 8.

Mercer, R. F., 1974, Liberated, produced, recycled or contamination: SPWLA 15th Annual Logging Symposium, Jun. 2-5, 1974, p 18.

Mouchett, Jean-Paul, and Alan Mitchell, 1989, Abnormal Pressures While Drilling, Manuels Techniques 2: Boussens, France, Elf Aquitaine, p. 255.

Passey, Q. R, S. Creaney, J. B. Kulla, F. J. Moretti, and J. D. Stroud, 1990, A practical model for organic richness from porosity and resistivity logs: American Association of Petroleum Geologists Bulletin, v. 74, no. 12, p. 1777-1794.

The invention claimed is:

1. A method for analyzing pore pressure in a subterranean organic-rich or gas- and/or oil-bearing shale formation comprising:
gathering from a well formed in a subterranean formation (i) resistivity log data and (ii) one or more types of log data indicative of porosity selected from the group consisting of: sonic slowness and bulk density;
storing the resistivity log data and the one or more types of log data indicative of porosity on a non-transitory computer storage medium;
combining the resistivity log data with the one or more types of log data indicative of porosity, via a computer processor to generate a combined log data;
generating a combined log data graph for a defined depth window of the subterranean formation, wherein the combined log data graph provides a more accurate pore pressure as compared to either the resistivity log data or the one or more types of log data indicative of porosity;
calculating an estimated pore pressure for a given depth in the shale formation, wherein the estimated pore pressure is given by $$P_{combined} = (a*(Sv-(Sv-Ph)*(R0/Rn)x + b*(Sv-(Sv-Ph)*(\Delta Tn/\Delta T0)y))/(a+b)$$

where:
a, b are constants which can be varied;
Sv is vertical stress at current depth;
$P_{combined}$ is pore pressure calculated from both resistivity and sonic curves;
Ph is hydrostatic pressure;
R0, ΔT0 is based line (trend) resistivity and sonic interval transit time at current depth;
Rn, ΔTn observed resistivity and sonic interval transit time at current depth; and
x, y are Eaton exponents; and
managing a back-pressure on a drilling mud system to maintain the back-pressure at or above the estimated pore pressure.

2. The method according to claim 1, wherein the estimated pore pressure is derived using an Eaton formula.

3. The method according to claim 1, wherein:
a first intermediate value for pore pressure is derived separately from the resistivity log data;
one or more further intermediate values for pore pressure are derived separately from porosity-indicative log data; and
the first intermediate value and the one or more further intermediate values are combined to derive the estimated pore pressure.

4. The method according to claim 3, wherein the first intermediate value for pore pressure and further intermediate values for pore pressure are combined using a weighted mean, where the weighted mean includes two weighting values (a, b) that may be selected in advance based on rock type.

5. The method according to claim 1 wherein the resistivity log data and the one or more types of log data indicative of porosity are combined using a weighted mean, where the weighted mean includes two weighting values (a, b) that may be selected in advance based on rock type.

6. The method according to claim 1, wherein the drilling mud system manages the back-pressure by adjusting a mud pressure via one or more pumps.

7. The system according to claim 6, wherein the drilling mud system manages the back-pressure by adjusting a mud density.

8. The method according to claim 1, wherein the drilling mud system manages the back-pressure by adjusting a mud density.

9. A system for analyzing pore pressure in a subterranean formation comprising:
a drill string disposed in a well formed in a subterranean formation, the drill string operable to gather resistivity log data and porosity log data during operation;
a non-transitory computer storage medium operable to store the resistivity log data and the porosity log data; and
a computer processor having instructions stored on the non-transitory computer storage medium and executable by the computer processor to:
combine the resistivity log data with the porosity data to generate a combined log data;
generating a combined log data graph for a predefined depth window of the subterranean formation,
calculate an estimated pore pressure for a given depth in a shale formation,
wherein the estimated pore pressure is given by $$P_{combined} = (a*(S_v-(S_v-P_n)*(R_0/R_n)x + b*(S_v(S_v-P_h)*(\Delta T_n/\Delta T_0)y))/(a+b)$$

where:
a, b, are constants which can be varied;
$S_v$ is vertical stress at current depth;
$P_{combined}$ is pore pressure calculated from both resistivity and sonic curves;
$P_h$ is hydrostatic pressure;
$R_0$, $\Delta T_0$ is based line (trend) resistivity and sonic interval transit time at current depth;
$R_n$, $\Delta T_n$ is observed resistivity and sonic interval transit time at current depth; and
x, y are Eaton exponents; and
manage a back-pressure on a drilling mud system to maintain the back-pressure at or above the estimated pore pressure.

10. The system according to claim 9, wherein the porosity log data is selected from the group consisting of: sonic slowness and bulk density.

11. The system according to claim 9, wherein the estimated pore pressure is derived using an Eaton formula.

12. The system according to claim 9, wherein:
a first intermediate value for pore pressure is derived separately from the resistivity log data;
one or more further intermediate values for pore pressure are derived separately from porosity-indicative log data; and
the first intermediate value and the one or more further intermediate values are combined to derive the estimated pore pressure.

13. The system according to claim 12, wherein the first intermediate value for pore pressure and the one or more further intermediate values for pore pressure are combined using a weighted mean, where the weighted mean includes two weighting values (a, b) may be selected in advance based on rock type.

14. The system according to claim 9, wherein the resistivity log data and the one or more types of log data indicative of porosity are combined using a weighted mean, where the weighted mean includes two weighting values (a, b) may be selected in advance based on rock type.

15. The system according to claim 9, wherein the drilling mud system manages the back-pressure by adjusting a mud pressure via one or more pumps.

* * * * *